(12) United States Patent (10) Patent No.: US 10,839,521 B2
Sawai (45) Date of Patent: Nov. 17, 2020

(54) IMAGE PROCESSING APPARATUS, IMAGE PROCESSING METHOD, AND COMPUTER-READABLE STORAGE MEDIUM

(71) Applicant: CANON KABUSHIKI KAISHA, Tokyo (JP)

(72) Inventor: Yosuke Sawai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 16/179,047

(22) Filed: Nov. 2, 2018

(65) Prior Publication Data

US 2019/0147598 A1 May 16, 2019

(30) Foreign Application Priority Data

Nov. 15, 2017 (JP) ................. 2017-220126

(51) Int. Cl.
*G06T 7/194* (2017.01)
*G06T 5/50* (2006.01)
(Continued)

(52) U.S. Cl.
CPC ............ *G06T 7/194* (2017.01); *G06T 3/4038* (2013.01); *G06T 5/50* (2013.01); *G06T 11/001* (2013.01);
(Continued)

(58) Field of Classification Search
CPC ....... G06T 7/194; G06T 11/40; G06T 11/001; G06T 3/4038; G06T 11/60; G06T 5/50; G06T 2207/10144; G06T 2207/30232; G06T 2207/30196; G06T 13/40; G06T 2200/24; G06T 2207/10052; G06T 3/4015; G06T 3/4053; G06T 5/001; G06T 7/55; G06T 7/0012; G06T 2207/20092; G06T 2207/20104; G06T 2207/20108; G06T 5/002; G06T 2207/10024; G06T 2207/10028; G06T 3/00; G06T 7/20; G06T 7/80; H04N 7/183; H04N 7/18;
(Continued)

(56) References Cited

U.S. PATENT DOCUMENTS 9,202,112 B1   12/2015  Ueta et al.
9,792,491 B1*  10/2017  Ramaswamy ..... G06K 9/00255
(Continued)

FOREIGN PATENT DOCUMENTS

JP   2015-222881 A   12/2015
JP   2016-115214 A    6/2016
WO   2009/078957 A1   6/2009

OTHER PUBLICATIONS

Apr. 3, 2019 European Search Report in European Patent Appln. No. 18204082.4.
(Continued)

*Primary Examiner* — Nimesh Patel
(74) *Attorney, Agent, or Firm* — Venable LLP

(57) ABSTRACT

An image processing apparatus specifies, in a foreground region which includes a foreground object in an input image obtained by image capturing, a first region including a predetermined target object, and outputs an output image generated by abstracting the first region without abstracting at least a part of a second region which does not include the predetermined object in the foreground region.

16 Claims, 9 Drawing Sheets

(51) Int. Cl.
*G06T 11/60* (2006.01)
*H04N 5/272* (2006.01)
*G06T 3/40* (2006.01)
*H04N 7/18* (2006.01)
*G06T 11/00* (2006.01)
*G06T 11/40* (2006.01)

(52) U.S. Cl.
CPC .............. *G06T 11/40* (2013.01); *G06T 11/60* (2013.01); *H04N 5/272* (2013.01); *H04N 7/18* (2013.01); *H04N 7/183* (2013.01); *G06T 2207/10144* (2013.01); *G06T 2207/30196* (2013.01); *G06T 2207/30232* (2013.01)

(58) Field of Classification Search
CPC .. H04N 5/272; H04N 5/23212; H04N 5/2254; H04N 5/2258; H04N 5/265; H04N 5/23296; H04N 13/207; H04N 5/2253; H04N 5/2257; H04N 5/2628; H04N 7/01; H04N 5/2259; G06F 2203/04104; G06F 2203/04105; G06F 2203/04808; G06F 3/013; G06F 3/016; G06F 3/0416; G06F 3/048; G06F 3/04815; G06F 19/321; G06F 16/40; G06F 16/50; G06F 16/70; G06F 17/175; G06F 3/0346; G02B 13/0065; G02B 13/009; G02B 17/008; G02B 13/001; G02B 17/0896; G02B 27/1066; G02B 7/282; G02B 7/04; G02B 7/102; G02B 26/00; G02B 17/02; G02B 26/10; G02B 27/0075; G01J 3/2823; G01J 3/0229; G01J 3/36; G01J 3/447; G01J 3/51; G01J 3/513; G01J 2003/2826; G01J 3/2803; G06K 9/4652; G06K 9/481; G06K 9/6256; G06K 9/628; G06K 2009/4657; G06K 2209/17; G06K 9/2036; G06K 9/209; G06K 9/4661; G06K 9/6269; G06K 9/6271; G06K 9/6282; G06K 9/00201; G06K 9/00369; G06K 9/00671; G06K 9/00711; G06K 9/2054; G06K 9/228; G06K 9/3233; A61B 5/0075; A61B 5/6898; A61B 8/4245; A61B 8/46; A61B 8/52; A61B 8/5207; A61B 8/5223; A61B 8/565; G03B 13/36; G03B 17/17; G03B 2205/0046; G03B 37/04; G03B 5/00

See application file for complete search history.

(56) References Cited

U.S. PATENT DOCUMENTS

| | | | |
|---|---|---|---|
| 2007/0183662 A1* | 8/2007 | Wang | G06K 9/00248 382/173 |
| 2007/0257912 A1* | 11/2007 | Repin | G01V 1/34 345/426 |
| 2010/0020097 A1* | 1/2010 | Mai | G06T 3/4038 345/629 |
| 2010/0278426 A1* | 11/2010 | Piramuthu | G06K 9/00234 382/173 |
| 2012/0320162 A1* | 12/2012 | Lo | G06T 7/564 348/47 |
| 2013/0016879 A1* | 1/2013 | Baele | G06K 9/00201 382/103 |
| 2014/0184644 A1* | 7/2014 | Sharma | G06T 19/006 345/633 |
| 2015/0339519 A1 | 11/2015 | Ueta et al. | |
| 2016/0163053 A1* | 6/2016 | Tang | H04N 5/23222 348/135 |
| 2016/0171332 A1* | 6/2016 | Kawano | G06T 7/215 382/173 |
| 2017/0316575 A1* | 11/2017 | Adachi | G06T 5/50 |

OTHER PUBLICATIONS

Shagan Sah, et al., "Video redaction: a survey and comparison of enabling technologies," Journal of Electronic Imaging, vol. 26, No. 5, Jul. 2017, pp. 051406-1-051406-14.

Florian Matusek, "Selective Privacy Protection for Video Surveillance," Acta Universitatis Ouluensis A 622, May 2014, pp. 1-167.

* cited by examiner

IMAGE PROCESSING APPARATUS, IMAGE PROCESSING METHOD, AND COMPUTER-READABLE STORAGE MEDIUM

BACKGROUND OF THE INVENTION

Field of the Invention

The present invention relates to a technique to occlude a predetermined subject in a captured image.

Description of the Related Art

In recent years, monitoring cameras have become widely installed. A system using such monitoring cameras is useful in crime prevention, marketing analysis, and for improving service by allowing the movement of each captured person in the image to be specified. On the other hand, in such a system, it is important to protect the privacy of the captured person in the image. Japanese Patent Laid-Open No. 2016-115214, discloses a method of superimposing a foreground image which has been made (occluded) into a silhouette on a background image. Japanese Patent Laid-Open No. 2015-222881 also discloses a method of extracting a person region, superimposing a mask image corresponding to the characteristics of the person region, and displaying the superimposed image.

In Japanese Patent Laid-Open No. 2016-115214, although a background difference method is used when a foreground image is to be extracted, it can be influenced by the shadow of a privacy protection target person (to be referred to as a "target person" hereinafter). For example, if the target person is lit by a spotlight and a shadow is formed, the shadow is also extracted as the foreground in the same manner as the target person. Hence, even the shadow is made into a silhouette, and it becomes difficult to discriminate whether the silhouette in the image is that of a person or a shadow. In the same manner, in Japanese Patent Laid-Open No. 2015-222881, a mask image can be superimposed and displayed on a shadow region. An object held by the person can also be made into a silhouette in a similar manner to the shadow. Furthermore, even in case in which the occlusion target is other than a person, an object or a shadow other than the target may be made into a silhouette in a similar manner.

SUMMARY OF THE INVENTION

The present invention provides a technique that can generate an image in which an appropriate region of a captured image is occluded.

According to one aspect of the present invention, there is provided an image processing apparatus comprising: a specification unit configured to specify, in a foreground region which includes a foreground object in an input image obtained by image capturing, a first region including a predetermined target object; and an output unit configured to output an output image generated by abstracting the first region without abstracting at least a part of a second region which does not include the predetermined object in the foreground region.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Hardware Arrangement)

Figure 1:
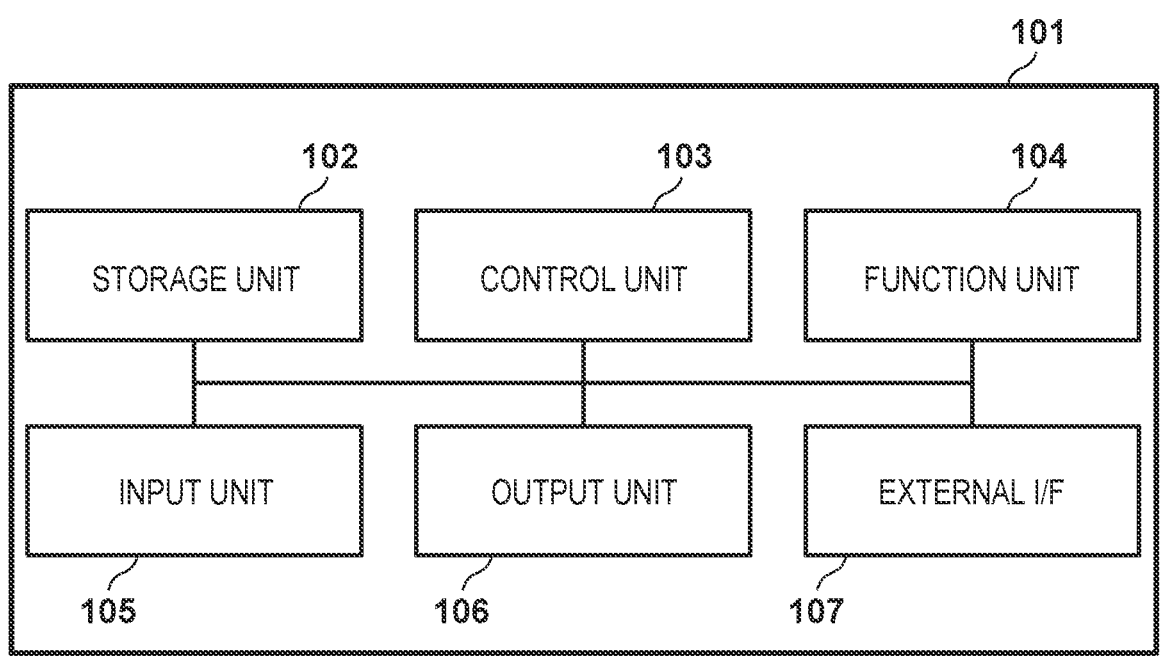
FIG. 1 is a block diagram showing an example of the arrangement of an image processing apparatus.

FIG. 1 shows an example of the hardware arrangement of an image processing apparatus 101 according to this embodiment. The image processing apparatus 101 is, in one example, a general-purpose computer, and its hardware arrangement includes, for example, a storage unit 102, a control unit 103, a function unit 104, an input unit 105, an output unit 106, and an interface (I/F) 107. Note that the image processing apparatus 101 may be implemented by dedicated hardware that implements the functions to be described later.

The storage unit 102 is formed by both or one of a ROM and a RAM, and stores programs to execute the various kinds of operations (to be described later) and various kinds of information such as parameters to be used in various kinds of processes. Here, ROM is the acronym of Read Only Memory, and RAM is the acronym of Random Access Memory. Note that other than a memory such as the ROM, RAM, or the like, a storage medium such as a flexible disk, a hard disk, an optical disk, a magneto-optical disk, a CD-ROM, a CD-R, a magnetic tape, a nonvolatile memory card, or a DVD can be used as the storage unit 102. The storage unit 102 may also be formed from a plurality of memories or the like.

The control unit 103 is formed from a CPU or an MPU and controls the overall image processing apparatus 101 by executing the programs stored in the storage unit 102. Note that the control unit 103 may control the overall image processing apparatus 101 in cooperation with the OS and a program stored in the storage unit 102. Here, CPU is the acronym of Central Processing Unit, MPU is the acronym of Micro Processing Unit, and OS is the acronym of Operating System. The control unit 103 may be formed by a plurality of processors such as a multi-core processor or the like. It is possible to use, as the control unit 103, an FPGA (Field Programmable Gate Array), a DSP (Digital Signal Processor), an ASIC (Application Specific Integrated Circuit), or the like. The control unit 103 can also control the function unit 104 to execute predetermined processing such as image capturing and the like.

The function unit 104 is hardware for the image processing apparatus 101 to execute predetermined processing. For example, in a case in which the image processing apparatus 101 includes a camera such as a monitoring camera, the function unit 104 is the image capturing unit and executes image capturing processing. The input unit 105 accepts various kinds of operations from a user. The output unit 106 makes various kinds of outputs to the user. Here, an output by the output unit 106 includes at least one of a visual output, an audio output, a vibration output, and the like. Note that although the output unit 106 may present information to the user by using a device included in the image processing apparatus 101, it may cause an external device (for example, a display device or a loudspeaker) to present the information. Note that the input unit 105 and the output unit 106 may be implemented together by a single module such as a touch panel.

The I/F 107 is an interface, such as a communication interface to an external device. For example, the image processing apparatus 101 obtains image data from an external monitoring camera through the I/F 107. The I/F 107 can be, for example, a wired or wireless communication interface. In addition, the I/F 107 can be a USB (Universal Serial Bus) interface or the like.

An example of the functional arrangement of the image processing apparatus 101 which includes the above-described arrangement and several examples of processing procedures to be executed by the image processing apparatus 101 will be described hereinafter. The image processing apparatus 101 to be described below specifies, in a foreground region of a captured input image, a first region which includes a person. Then, while abstracting the first region (for example, making the first region into a silhouette), the image processing apparatus 101 outputs an output image of a second region, which does not include a person in the foreground region, without making at least a part of the image into a silhouette. As a result, it is possible to prevent at least a part of a shadow region from being made into a silhouette. Note that, according to the image processing apparatus 101 to be described below, although a part of a shadow may be made into a silhouette as a part of a person, it is possible to prevent a region from being made into a silhouette excessively in even such a case since the shadow region to be made into a silhouette is decreased.

Although a case in which a person is set as a target object to be made into a silhouette will be described hereinafter, the target object need not be a person. For example, all foreground objects may be set as targets to be made into silhouettes. In this case, a non-shadow object region is specified based on the characteristics of each object.

First Embodiment

In this embodiment, an input image obtained by image capturing and a background image obtained when a person is not present in the image capturing range of the input image are compared, and a foreground region where a foreground object is present in the image is specified. In addition, a first region which includes the person is specified in the foreground region, and a second region, which is a region outside the first region in the foreground region, is removed as an abstraction target (anonymization target). This allows the person region to be occluded while suppressing the occlusion of the shadow region, and prevents a state in which many regions are unnecessarily occluded. Note that in the specification of the first region, a third region (human body frame) that has been determined to include a person based on the characteristics of the person (head or the like) is specified, and a region that can be obtained from the third region and the foreground region is specified as the first region. As a result, it is possible to prevent a person in a poster from being erroneously included in the first region. Also, in the specification of the third region, for example, a fourth region (head region) which includes a head region is specified based on the characteristics of the head, and a region that is obtained by expanding the fourth region based on the information of the ratio between the size of the head and the size of the entire human body is specified as the third region. According to this embodiment, a human body frame can be determined easily based on the specification of the head region by a conventional technique.

(Functional Arrangement)

Figure 2:
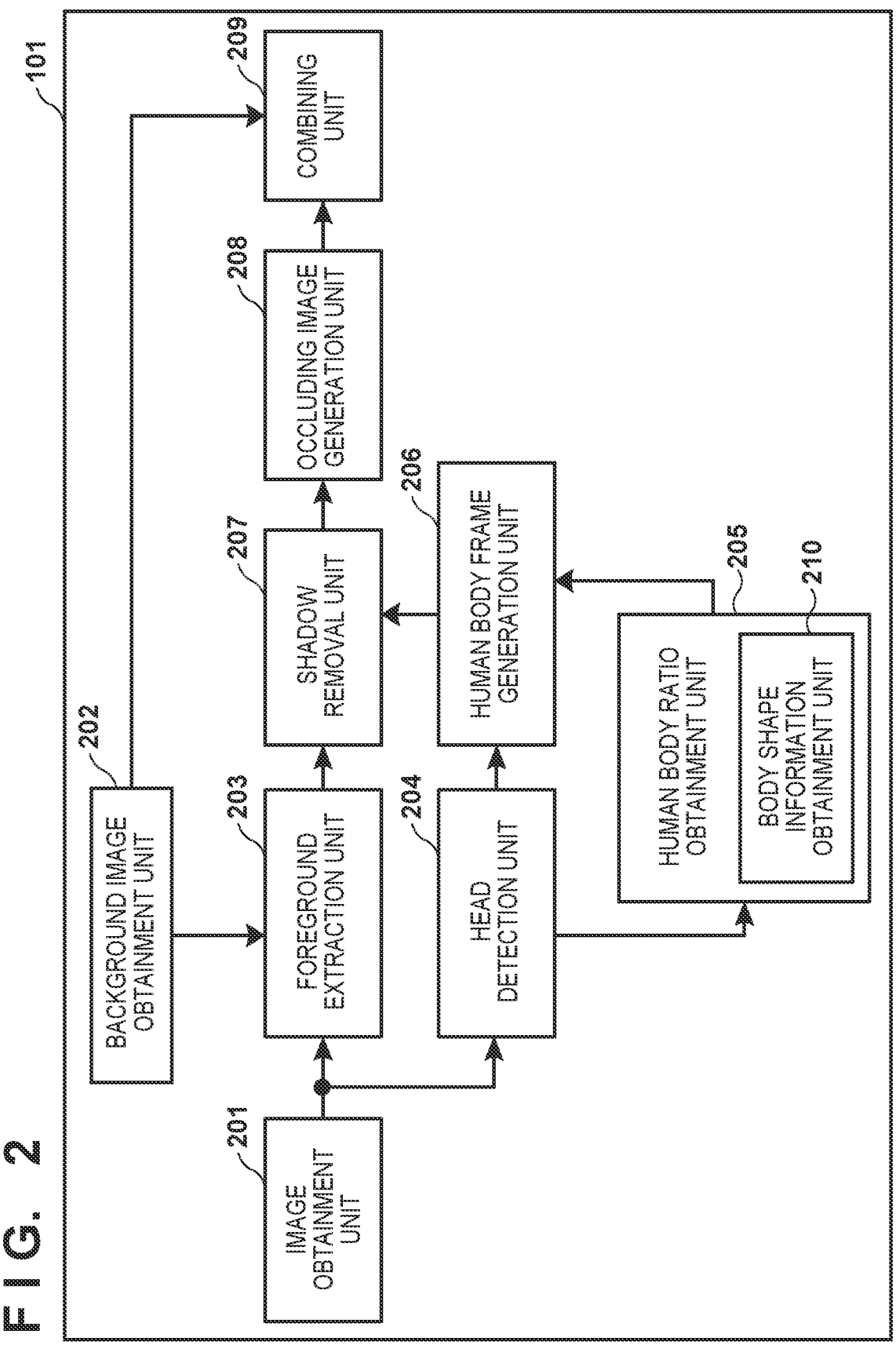
FIG. 2 is a block diagram showing an example of the first functional arrangement of the image processing apparatus.

FIG. 2 is a block diagram showing an example of the functional arrangement of the image processing apparatus 101 according to this embodiment. The image processing apparatus 101 includes as its functional units, for example, an image obtainment unit 201, a background image obtainment unit 202, a foreground extraction unit 203, a head detection unit 204, a human body ratio obtainment unit 205, a human body frame generation unit 206, a shadow removal unit 207, an occluding image generation unit 208, and a combining unit 209. Note that the human body ratio obtainment unit 205 includes, for example, a body shape information obtainment unit 210.

The image obtainment unit 201 obtains image data obtained by, for example, the monitoring camera by capturing a monitoring target region. This image data will be referred to as an "input image" hereinafter.

The background image obtainment unit 202 obtains a background image of a state in which a foreground object such as a person is absent in the same image capturing region as the image obtained by the image obtainment unit 201. The background image may be an image captured in a state in which a foreground object is absent or an image generated from a plurality of images based on image processing or learning. For example, the background image can be prepared beforehand as an image captured before the activation of the monitoring system. Also, a system administrator can designate a timing at which the foreground object will be absent, and an image captured at this timing may be set as the background image. A plurality of background images may be prepared in correspondence with periods of time so that the background image to be used will change in accordance the incident light on the background object or the like along with the elapse of time. The background image can also be generated from a plurality of images by, for example, using an object that does not change with the elapse of time as the background object. In this case, for example, a background image can be obtained by calculating an average value (for example, a weighted average value obtained by increasing the weight added to the image the closer the image is to the current time or a predetermined time) of a plurality of images. The background image may also be updated sequentially based on the method disclosed in Japanese Patent Laid-Open No. 2016-115214. Also, for example, machine learning for generating a background image by using a plurality of images may be performed, and a background image can be generated by inputting each image obtained by the image obtainment unit 201 to a function acquired by the learning. Furthermore, machine learning for determining whether the input image is a background image can be performed, and whether the image is a background image can be determined by inputting each image obtained by the image obtainment unit 201 to a function acquired by the learning. In this case, the background image obtainment unit 202 can obtain the image which is determined to be the background image among the images input to the function.

The foreground extraction unit 203 extracts a foreground region by comparing the input image obtained by the image obtainment unit 201 and the background image obtained by the background image obtainment unit 202. The foreground extraction unit 203 can generate, for example, a mask image in which the foreground region is set as "1" and the background image is set as "0". To generate such a mask image, the foreground extraction unit 203 can use, for example, a background difference method to set, for each pixel, "1" to indicate the foreground if the difference value between the background image and the input image is equal to or more than threshold, and set "0" to indicate the background if the difference value is less than the threshold. Note that the mask image need not be a binary image. For example, each value corresponding to the difference value between the background image and the input image may be set as the mask image. The foreground extraction unit 203 may specify the foreground region by not only the background difference method but also other methods. For example, the foreground extraction unit may use machine learning to specify the foreground region of the input image. The foreground extraction unit 203 may only hold the information specifying the foreground region without generating a mask image.

The head detection unit 204 determines whether a human head is included in the input image obtained from the image obtainment unit 201, and obtains, when a head is included, the position and the size (the vertical and horizontal sizes of the region including the head) of the head in the image. Note that in one example, a position such as the top of the head which is farthest from the human body such as hands or legs may be specified as the position of the head or the center of a region detected as the head may be specified as the position of the head. Human head detection processing can be implemented by using a known image processing technique. For example, the head detection unit 204 can detect a human head by executing pattern matching by using the characteristics (for example, the face, facial parts, and characteristics of an object related to the head such as a hat, a hair accessory, or the like) of the human head. Note that in a case in which the occlusion target is not a person, a similar kind of detection processing can be performed by using the characteristics of the occlusion target object or the characteristics of an object related to the occlusion target object. The head detection unit 204 may also specify the head region by, for example, inputting the input image to a function obtained by machine learning for specifying the facial region of a person. The head detection unit 204 may also detect the head region in the foreground region extracted by the foreground extraction unit 203. That is, for example, even in a case in which a person is included in the background, such as in a case in which a photograph of a person has been decorated or the like, it may be set so that the head detection unit 204 will not detect the person in the background but will detect a head (person) from only the foreground region.

The human body ratio obtainment unit 205 obtains the ratio between the size of the head portion and the size of the entire human body in the image based on the size of the head on the image detected by the head detection unit 204 and the information of the height and the body width obtained by the body shape information obtainment unit 210. The body shape information obtainment unit 210 can obtain, for example, the statistical or empirical information of the ratio between the size of the head and the size of the human body including the head. For example, in a case in which this ratio is 1:7, the human body ratio obtainment unit 205 outputs the information of this ratio to the human body frame generation unit 206. Note that, since it is generally known for this ratio to change in accordance with the age, the body shape information obtainment unit 210 can obtain the information of this ratio for each age. In this case, the head detection unit 204 can estimate the age by using a facial model which is used as a reference during the detection of the head, and output this estimation result to the human body ratio obtainment unit 205. The human body ratio obtainment unit 205 can subsequently output a human body ratio corresponding to this age estimate. Note that the human body ratio obtainment unit 205 may also specify the human body ratio by, for example, inputting the input image or information of the size of the head region to a function obtained by machine learning.

Based on the coordinates of the position of the head and the size of the head region obtained from the head detection unit 204 and the human body ratio obtained from the human body ratio obtainment unit 205, the human body frame generation unit 206 generates, as a human body frame, a frame that defines a range in which the head region has been expanded in the direction of the feet with respect to the head as a reference. That is, based on the human body ratio with respect to the head region detected by the head detection unit 204 as a reference, the human body frame generation unit 206 specifies a region that includes the torso accompanying the head and the hands and feet portion and generates a human body frame corresponding to the specified region.

In the foreground region extracted by the foreground extraction unit 203, the shadow removal unit 207 excludes, from the occlusion target, a region outside of the human body frame which has been generated by the human body frame generation unit 206. For example, in the mask image generated by the foreground extraction unit 203, the shadow removal unit 207 updates each pixel, which is present in a region outside the human frame and holds a setting value of "1" indicating the foreground, so that the setting value will be "0". This will remove a region which is outside the human frame from the occlusion target in the mask image since the value of a region other than the human frame in the foreground region will be changed to a value indicating the background. That is, although a shadow accompanying a person can be extracted as the foreground by the foreground extraction unit 203 since the human body frame is specified from the ratio between the head and the human body, (at least a part of) the shadow will not be included as the occlusion target. Also, the shadow removal unit 207 may correct the information indicating the foreground region which is managed by the foreground extraction unit 203 so that a region which is not the human body frame will be removed from the foreground. That is, a mask image need not be used.

In the mask image in which the shadow portion has been removed by the shadow removal unit 207, the occluding image generation unit 208 generates a silhouette image of the region set with a value "1", which indicates the foreground, by filling the region with arbitrary RGB values or adding a texture to the region. Note that the silhouette image may be generated by using another method to mask this region. It may use, for example, a mosaic image obtained by performing mosaic processing on the foreground, a blurred image obtained by performing blur processing on the foreground, or, if the silhouette image is to be combined with a background image obtained by removing the foreground, an outline image obtained by extracting the outline of the foreground. The occluding image generation unit 208 may also generate a silhouette image based on information indicating a foreground region in which the shadow region has been removed by information which is not the mask image.

The combining unit 209 generates and outputs a combined image by combining the silhouette image generated by the occluding image generation unit 208 with the background image obtained by the background image obtainment unit 202 by executing a blending. Note that when executing a blending, the RGB values of each pixel are calculated by using $\alpha(0.0 \le \alpha \le 1.0)$ corresponding to the transmittance.

In this embodiment, although the combining unit 209 will blend the background image and the silhouette image, it may blend the input image and the silhouette image. That is, the combining unit may generate, in an image including a foreground object other than a person (occlusion target), an image in which the occlusion target has been occluded.

Note that the above-described arrangement is merely an example and need not include all of these functional units. For example, in a case in which a person region that includes the head can be specified by machine learning, the head detection unit 204, the human body ratio obtainment unit 205, and the human body frame generation unit 206 can be omitted, and a single person-region specification unit can be arranged instead.

(Processing Procedure)

Figure 3:
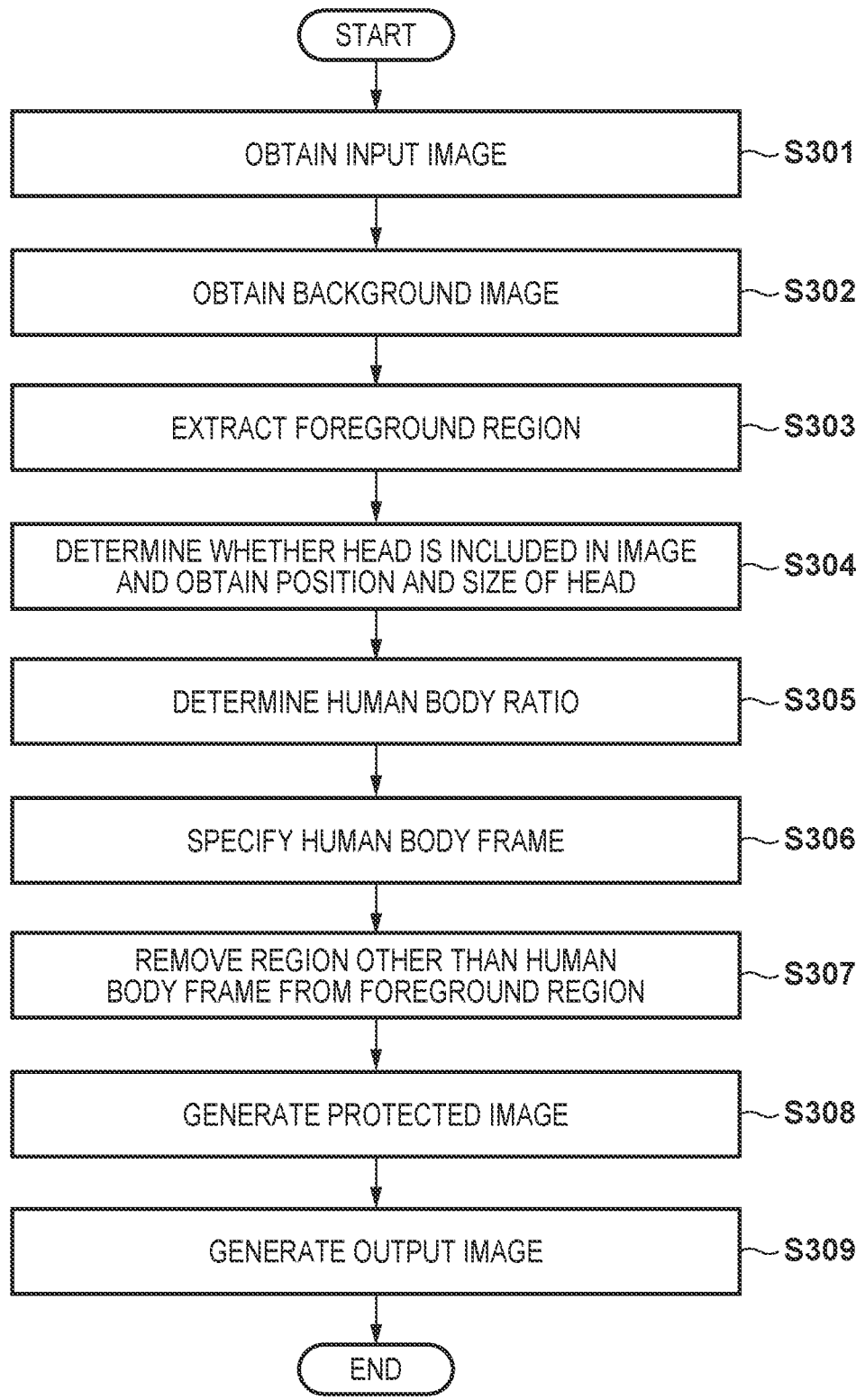
FIG. 3 is a flowchart showing an example of the procedure of processing to be executed by the image processing apparatus.

An example of the processing procedure to be executed by the image processing apparatus 101 will be described next with reference to FIG. 3. The image processing apparatus 101 first obtains an input image and a background image (steps S301 and S302). The image processing apparatus 101 subsequently extracts (step S303) a foreground region by, for example, the background difference method which uses the input image and the background image, and generates a mask image. The image processing apparatus 101 determines whether a head is included in the input image, and obtains (step S304) the position and the size of the head in the image if the head is included. The image processing apparatus 101 determines the human body ratio on the image with respect to the head (step S305). Then, based on the coordinates of the position of the head obtained in step S304 and the human body ratio determined in step S305, the image processing apparatus 101 specifies, as the human body frame, a frame obtained by expanding the head region in the feet direction with respect to the head as a reference (step S306). Subsequently, the image processing apparatus 101 removes the region outside the human body frame that was specified in step S306 from the foreground region extracted in step S303 (step S307). The image processing apparatus 101 generates a silhouette image by filling the foreground region in which the region outside the human body frame has been removed in step S307 (step S308), combines the silhouette image with the background image obtained in step S302, and generates an output image (step S309).

As described above, according to this embodiment, since a region other than the person region is not made into a silhouette even if the region is in the foreground region, unnecessary silhouette processing will not be performed. Although a case in which a person is set to be the occlusion target has been described in this embodiment as described above, the present invention is not limited to this. The same processing is applicable to any arbitrary occlusion target. That is, within the foreground region, a region that includes the occlusion target object itself and an object, other than a shadow, which accompanies the target object is set as the occluding region, and control is performed to exclude the shadow region from the occlusion target. In this case, although the reference data and the like to be used when specifying the region that includes the occlusion target object and a target object other than the shadow will change, it is possible to directly apply the above-described arrangement and method to other points.

Second Embodiment

Figure 5:
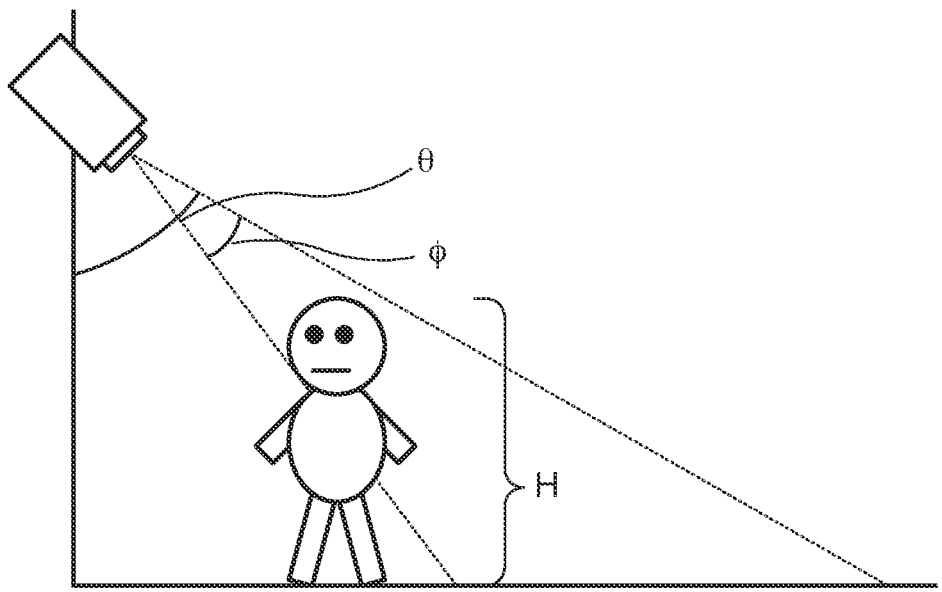
FIG. 5 is a schematic view showing the state of image capturing when a camera has been installed diagonally.

The second embodiment will describe processing for specifying a human body frame when the human body ratio is not constant depending on the position of the person captured by a camera. For example, in a case in which a monitoring camera is installed to face diagonally below as shown in FIG. 5, the ratio of the size of the apparent head and the size of the human body can change in accordance with the position of the person in the image. In the case of a monitoring camera as shown in FIG. 5, if a person has been captured in the upper portion of the image, that is, if the person is present in a position where the distance between the monitoring camera and the person in the horizontal direction is long, the ratio of the head with respect to the human body will increase. On the other hand, if the person has been captured in the lower portion of the image such as a position immediately below the monitoring camera, that is, if the person is present in a position where the distance between the monitoring camera and the person in the horizontal direction is short, the ratio of the head with respect to the human body will decrease. Also, in a case in which an omnidirectional camera is installed on the ceiling, since a case in which a person appears near the center of the image corresponds to a case in which the distance between the monitoring camera and the person is short, the ratio of the head with respect to the human body decreases, and the ratio increases as the position of the person moves further outside in the image.

In contrast, in this embodiment, the ratio of the head with respect to the human body is corrected by specifying an angle formed by the camera and the target person based on the internal parameters and the installation angle of the camera. This allows a human body frame to be appropriately specified when the human body ratio is not constant depending on the position of the person captured by the camera.

Figure 4:
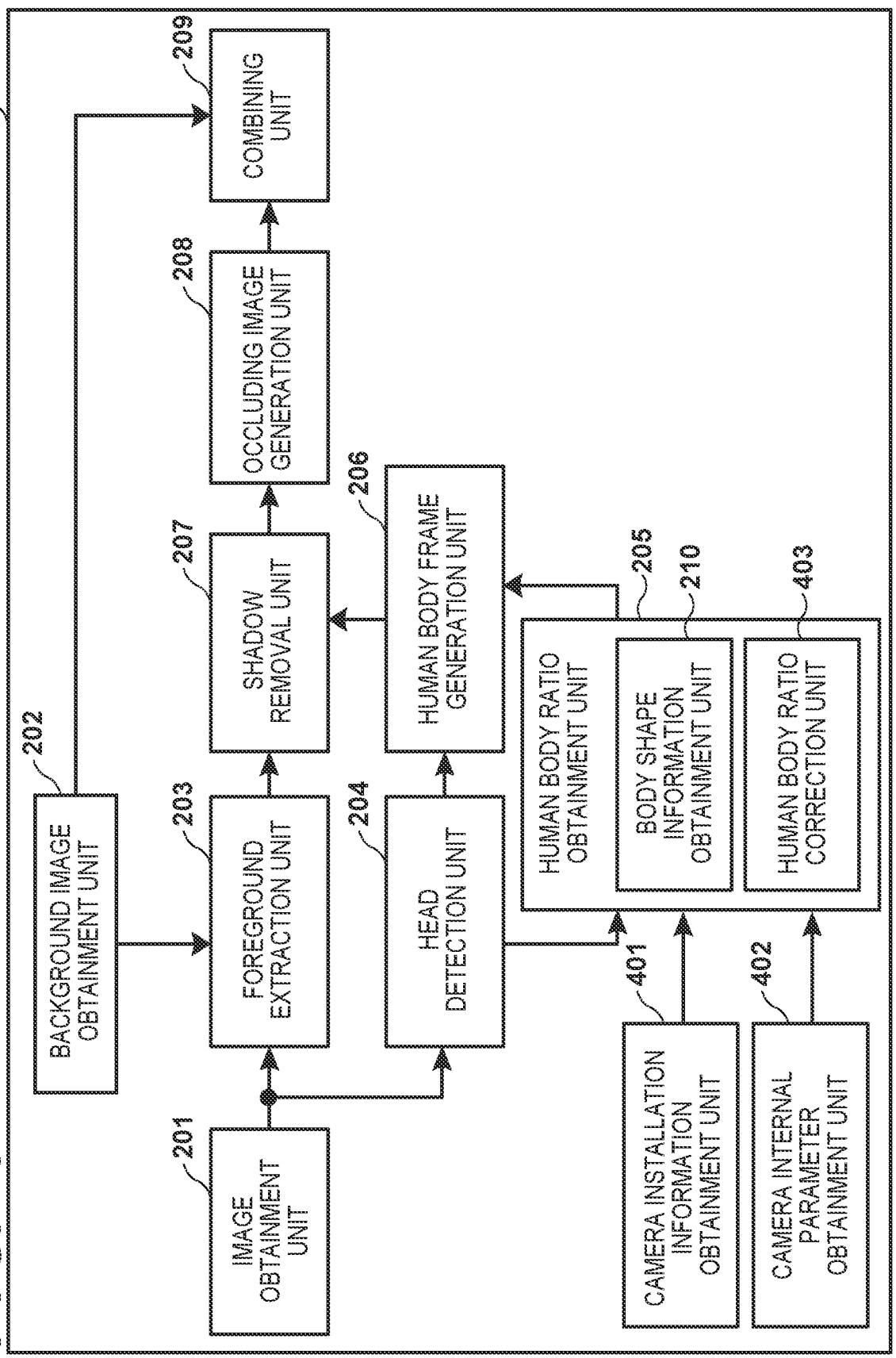
FIG. 4 is a block diagram showing an example of the second functional arrangement of an image processing apparatus.

FIG. 4 shows an example of the functional arrangement of an image processing apparatus 101 according to the second embodiment. Note that same reference numerals denote the same components as those in FIG. 2, and a description will be omitted. The image processing apparatus 101 according to this embodiment includes a camera installation information obtainment unit 401 and a camera internal parameter obtainment unit 402. A human body ratio obtainment unit 205 includes a human body ratio correction unit 403 in addition to a body shape information obtainment unit 210. The process of step S305 is changed by these functional units.

The camera installation information obtainment unit 401 obtains the information of the installation angle of the camera with respect to the ground. The camera internal parameter obtainment unit 402 obtains the internal parameters such as the focal distance of the camera, the center of the image, the size of the image, the distortion of the lens, and the like. These internal parameters are obtained by using a known image processing technique. The human body ratio correction unit 403 uses the coordinates of the head of the person in the image, the installation angle of the camera, and the internal parameters of the camera to correct the human body ratio obtained from the body shape information obtainment unit 210.

Figure 6:
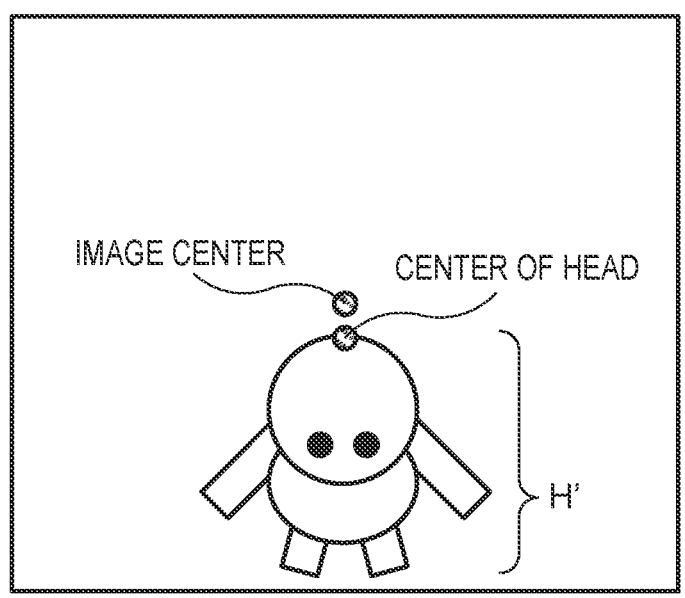
FIG. 6 is a view showing an example of an image captured in a state shown in FIG. 5.

For example, as shown in FIG. 5, assume that H represents a ratio in the vertical direction obtained from the body shape information obtainment unit 210, θ represents an angle formed by the ground and the center of the image when the camera is installed facing a diagonally downward direction, and it, represents an angle formed by a line indicating the direction of the image center and a line connecting the center of the camera and the position of the head of the person. In this case, a ratio H' of the human body of a target person captured by a camera as shown in FIG. 6 can be calculated by $$H'=H\times\cos(\theta-\phi)$$

The human body ratio in the horizontal direction can also be calculated in the same manner.

As described above, the human body ratio is specified in consideration of the installation state of the camera such as a camera that has been installed to face a diagonally downward direction. This can prevent an excessively large human body frame from being generated and can prevent a state in which an unnecessary region such as a shadow is made into a silhouette.

Third Embodiment

Figure 7:
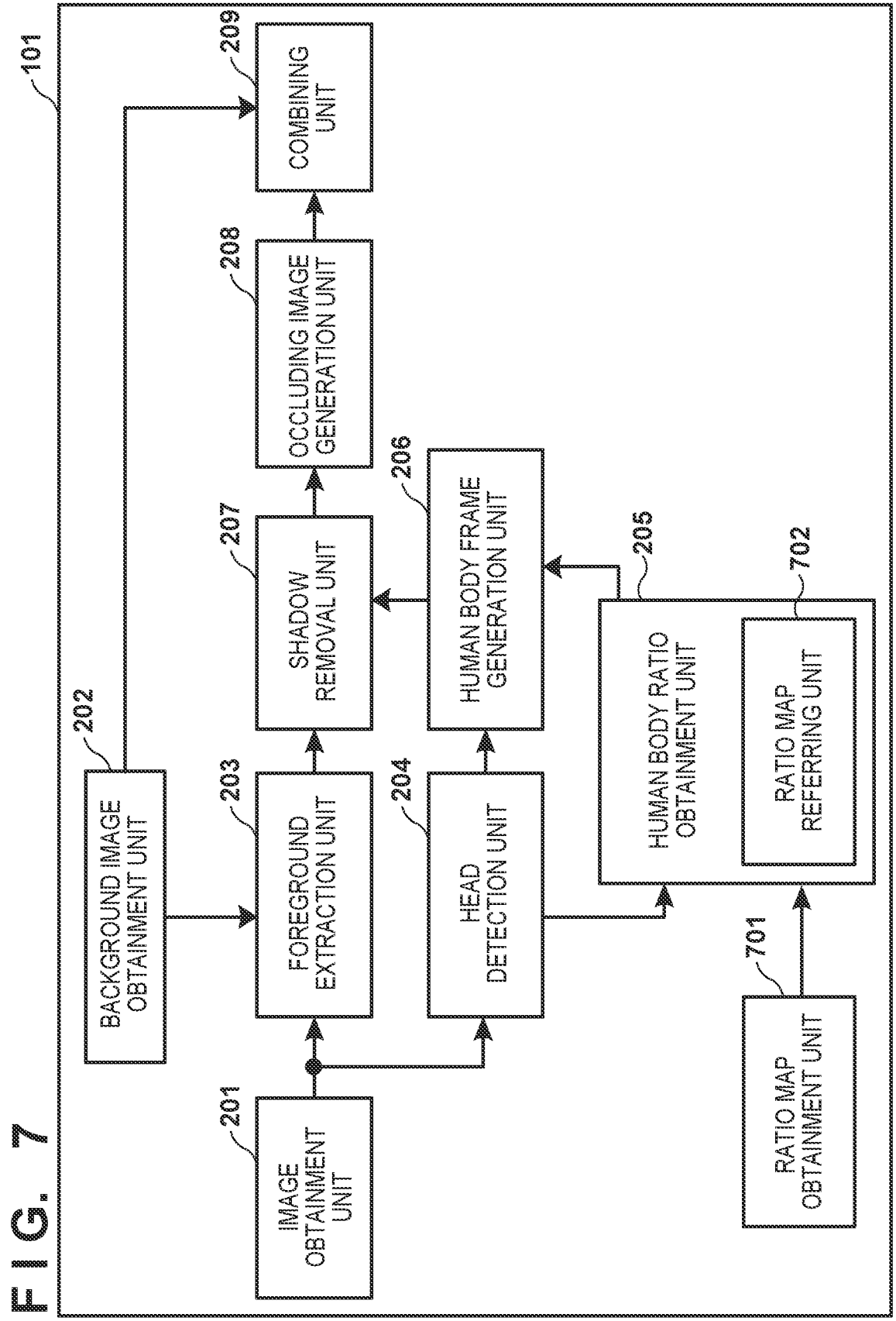
FIG. 7 is a block diagram showing an example of the third functional arrangement of an image processing apparatus.

The second embodiment described a method that allowed an appropriate ratio of the human body and a human body frame to be specified by executing a calculation corresponding to the camera installation state. The third embodiment will describe a method by which the human body ratio can be corrected easily. FIG. 7 shows an example of the functional arrangement of an image processing apparatus 101 according to this embodiment. Note that the same reference numerals denote the same components as those in FIG. 2, and thus a description will be omitted. The image processing apparatus 101 according to this embodiment includes a ratio map obtainment unit 701, and the human body ratio obtainment unit 205 includes a ratio map referring unit 702.

Figure 8:
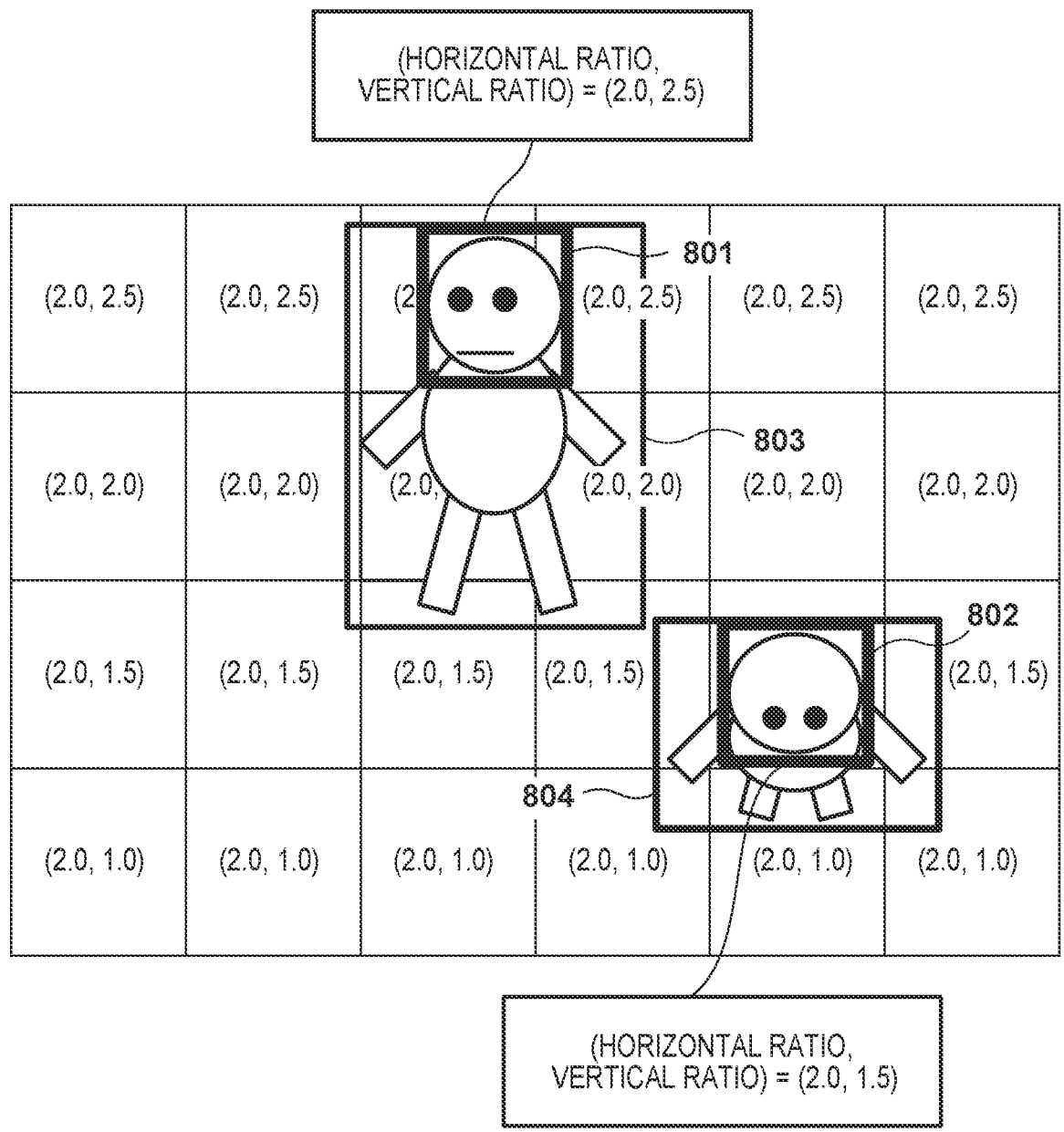
FIG. 8 is a view showing an example of a ratio map.

The ratio map obtainment unit 701 obtains a ratio map of the same image capturing region as or a similar image capturing region to the image obtained by the image obtainment unit 201. The ratio map is, as shown in FIG. 8, information associating the position of each block or each pixel of an input image and the information of the human body ratio. The ratio map of FIG. 8 is defined as information associating a block position and the human body ratio, and the numerical values assigned to each block indicate a horizontal ratio and a vertical ratio, respectively. Note that in the ratio map shown in FIG. 8, a lower region corresponds to a position whose distance to the camera in the horizontal direction is short, and an upper region corresponds to a position whose distance to the camera in the horizontal direction is long. As shown in FIG. 8, the longer the distance is from the camera in the horizontal direction, the larger the value of the vertical ratio is. Note that the ratio map of FIG. 8 shows a case in which the ratio information of each block is defined. However, the present invention is not limited to this, and the ratio information may be defined in an arbitrary pixel basis or for each arbitrary shape region. For example, the ratio information can be defined for each region which is to be substantially divided by a concentric circle or a concentric arc with respect to the horizontal position of the camera as a reference. The ratio map can be, for example, created manually. For example, head detection processing is performed on an image that captured a state including a person to obtain the size and the position of the head region, and the human body region within the image is designated with a rectangle by a UI or the like to obtain the size and position of the human body region. Subsequently, the position of the head and the position of the human body region are associated, the human body ratio is specified from the size of the head region and the size of the human body, and the specified pieces of information are written in the block, of the ratio map, which corresponds to the position where the person appears on the image. The ratio map is created by repetitively performing this operation until all of the blocks are filled.

The ratio map referring unit 702 has a function of referring to the ratio map obtained by the ratio map obtainment unit 701. The human body ratio obtainment unit 205 specifies the human body ratio in accordance with the position of the head which is detected by a head detection unit 204. For example, in the example shown in FIG. 8, when the ratio map is referred to with respect to the position of a head region 801, the horizontal ratio and the vertical ratio associated with this position are 2.0 and 2.5, respectively. In the same manner, when the ratio map is referred to with respect to the position of a head region 802, the horizontal ratio and the vertical ratio associated with this position are 2.0 and 1.5, respectively. The human body ratio obtainment unit 205 outputs these specified ratios to a human body frame generation unit 206. The human body frame generation unit 206 expands each region designated as the head region by the head detection unit 204 in accordance with the obtained values. For example, the human body frame generation unit 206 generates a human body frame 803 by expanding the head region 801 horizontally by a factor of 2.0 with respect to the top of the head as the center and expanding the head region 801 vertically by a factor of 2.5 in a direction opposite to the top of the head (that is, the direction of the human body). In the same manner, the human body frame generation unit 206 generates a human body frame 804 by expanding the head region 802 horizontally by a factor of 2.0 with respect to the top of the head as the center and expanding the head region 802 vertically by a factor of 1.5 in a direction opposite to the top of the head (that is, the direction of the human body). Note that the human body frame generation unit 206 need not expand the region in the direction opposite to the top of the head when expanding the region in a vertical direction, and for example, in a case in which a person is standing as in the example of FIG. 8 and the feet of the person are facing the lower direction of the captured image, the region can be expanded in the direction faced by the feet.

According to this embodiment, a human body frame can be specified without having to perform a calculation based on information such as the setting values of the camera. Also, in the specification performed on the ratio map, for example, the user can easily create a human body frame by manually designating the human body frame based on the captured image. Since information such as the setting values of the camera need not be used in this manner, even a user who is unfamiliar to camera settings can easily prepare a ratio map and apply the above-described method.

Note that, for example, a ratio map can be prepared for each estimated age of a person. This will allow a region suited for each estimated region to be specified as a human body frame, and thus prevent a state in which many regions are unnecessarily allocated as human body frames or a state in which a human body portion of a captured image does not fit within a human body frame.

Fourth Embodiment

Figure 9:
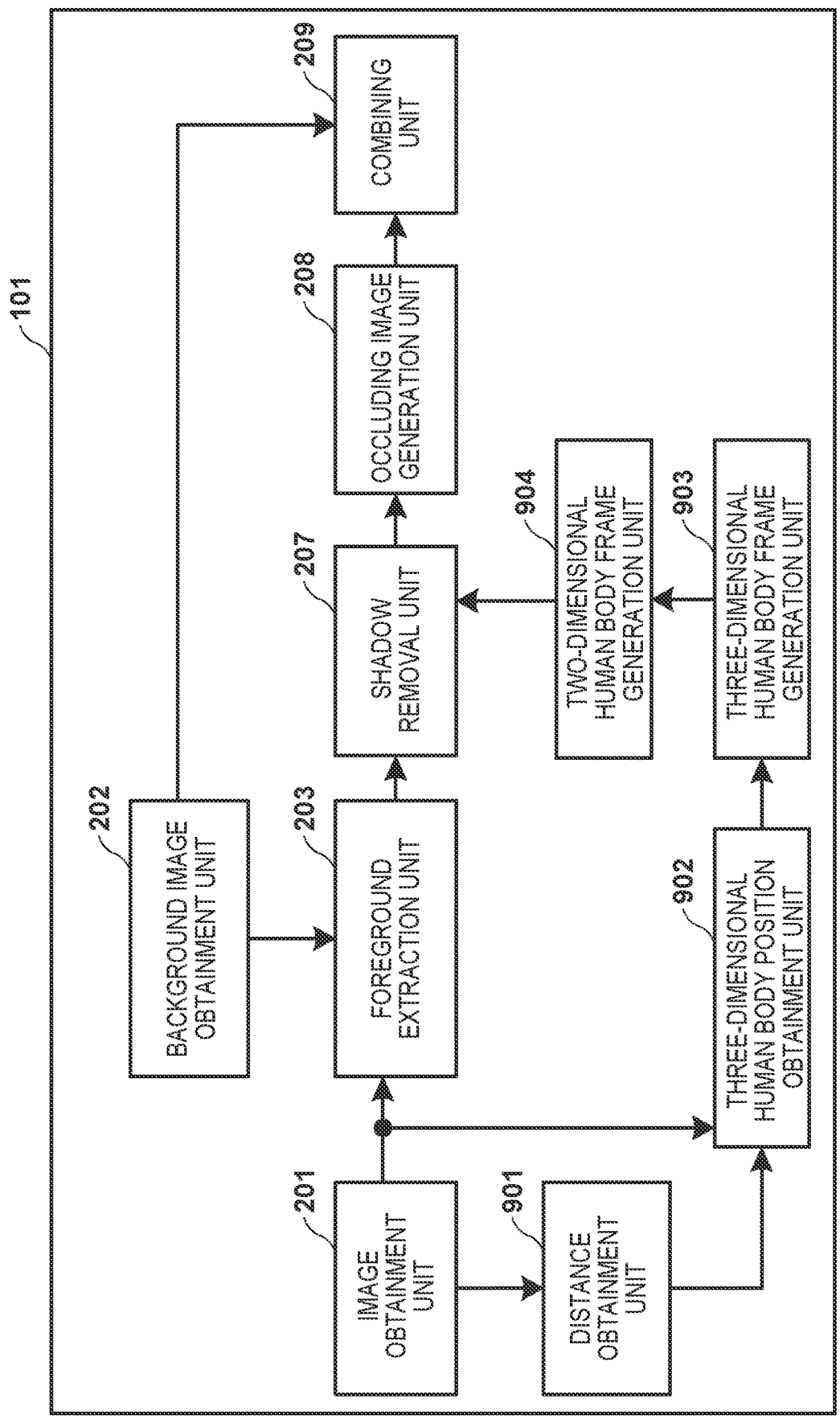
FIG. 9 is a block diagram showing an example of the fourth functional arrangement of an image processing apparatus.

The second and third embodiments described examples in which a human body frame was generated in accordance with the position of the person in the captured image. In the fourth embodiment, a human body frame is generated by three-dimensionally grasping a region where a person is present and projecting the three-dimensional region to a two-dimensional region belonging to the same image capturing range as the image obtained by an image obtainment unit 201. FIG. 9 shows an example of the functional arrangement of an image processing apparatus 101 according to this embodiment. Note that same reference numerals denote the same components as those in FIG. 2, and a description will be omitted. In the image processing apparatus 101 according to this embodiment, a head detection unit 204, a human body ratio obtainment unit 205, and a human body frame generation unit 206 are omitted, and in contrast, a distance obtainment unit 901, a three-dimensional human body position obtainment unit 902, a three-dimensional human body frame generation unit 903, and a two-dimensional human body frame generation unit 904 have been included.

The distance obtainment unit 901 obtains a distance image of the same image capturing range as the image obtained by the image obtainment unit 201. The distance image may be generated based on a plurality of images captured by a plurality of cameras or may be generated by another method such as the TOF (Time of Flight) method. Note that a camera used for capturing an image to be obtained by the image obtainment unit 201 or a camera used for distance image generation can be installed so that its line of sight direction will be horizontal with respect to the ground. However, in a case in which the line of sight direction is not horizontal with respect to the ground as in the case described in the second embodiment, a distance image can be obtained, for example, by using a three-dimensional rigid body transformation matrix.

The three-dimensional human body position obtainment unit 902 obtains the position of the human body in a three-dimensional space by specifying the two-dimensional human body position by using image processing on the input image obtained by the image obtainment unit 201 and associating the specified two-dimensional human body position with the distance data obtained by the distance obtainment unit 901. For example, the two-dimensional human body position is specified in the same manner as that performed by the above-described head detection unit 204, and the specified two-dimensional human body position and the distance data position obtained by the distance obtainment unit 901 are used to obtain the three-dimensional position of the head of a target person.

The three-dimensional human body frame generation unit 903 obtains the human body position in the three-dimensional space obtained by the three-dimensional human body position obtainment unit 902, and estimates the three-dimensional region where the human body is present. For example, a cylindrical three-dimensional human body frame having a radius of 50 cm with respect to the head as the center and a length to the ground (that is, the height of the body) is generated.

The two-dimensional human body frame generation unit 904 generates a two-dimensional human body frame by re-projecting the three-dimensional human body frame generated by the three-dimensional human body frame generation unit 903 onto a two-dimensional region in the image capturing region of the image captured by the image obtainment unit 201.

In this manner, a human body frame can be accurately specified by three-dimensionally specifying a human body region and mapping the three-dimensional human body region onto the same image capturing region as the input image. As a result, it can prevent a state in which many regions are unnecessarily allocated as human body frames or a state in which a human body portion of a captured image does not fit within a human body frame. In addition, for example, even in a case in which the head is not detected in the above-described embodiment because only the body portion has been captured in the input image obtained by the image obtainment unit 201, a human body frame can be appropriately determined by three-dimensionally recognizing and projecting the person to the input image. Furthermore, by three-dimensionally specifying a human body region, it can reduce the probability that a poster or the like will be specified as a person, and a human body frame can be directly discovered in the foreground region.

Note that the camera to be used to obtain the position of the human body may be the same camera as the camera used to capture the input image to be obtained by the image obtainment unit 201 or may be a separate camera. That is, as long as the three-dimensional position of the human body can be specified, it will be possible to specify the image capturing region of the human body in the same image capturing range as the input image obtained by the image obtainment unit 201. Hence, the position of the human body need not be obtained by the camera which is used to capture the input image.

Fifth Embodiment

Figure 10:
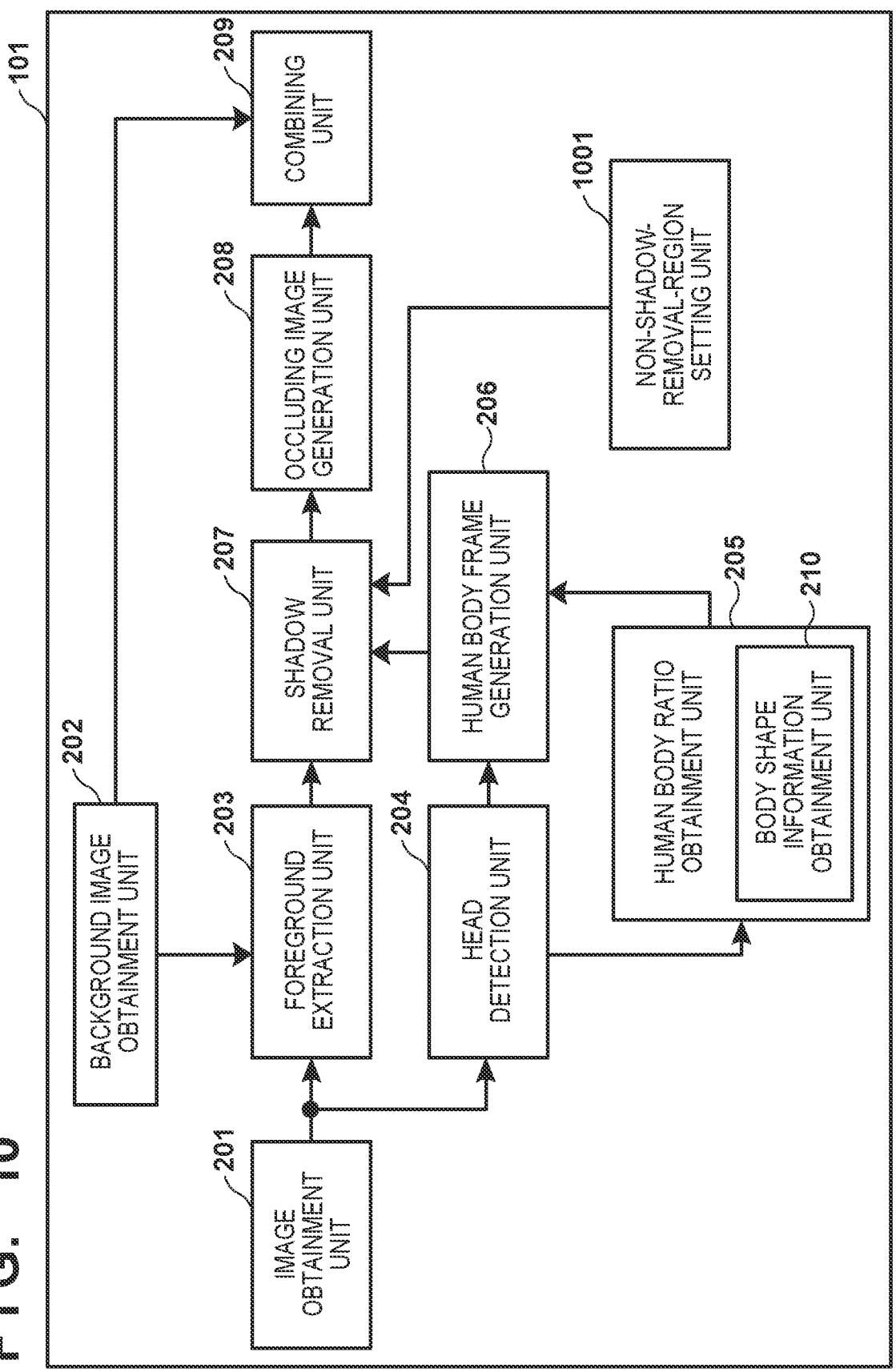
FIG. 10 is a block diagram showing an example of the fifth functional arrangement of an image processing apparatus.

The fifth embodiment will accept a user setting to perform silhouette processing on a portion of a region that is a shadow region and was not made into a silhouette in the above-described embodiments. An image processing apparatus 101 according to this embodiment includes a non-shadow-removal-region setting unit 1001 as shown in FIG. 10. The non-shadow-removal-region setting unit 1001 executes setting processing to make a region, which is excluded from a silhouette processing target region because it is recognized as a shadow within the foreground region, to be retained as a silhouette processing target region. For example, the non-shadow-removal-region setting unit executes setting processing to make a human body portion into a silhouette in a case in which a head is not detected. A non-shadow-removal-region setting unit 1001 accepts, from a user via a UI, the designation of a region in which shadow removal will not be performed. Subsequently, a shadow removal unit 207 removes, from the silhouette processing target in the foreground region specified by a foreground extraction unit 203, each region other than the human body frame and the non-shadow-removal region which was set by the non-shadow-removal-region setting unit 1001.

As a result, even in a case in which a region that should be made into a silhouette is not detected as a human body frame because, for example, the head is not detected, it is possible to prevent this region from being excluded from the silhouette processing target.

According to each embodiment described above, processing is executed so that, in a region which includes a foreground object in the captured image, a region that includes a predetermined target object such as a person is made into a silhouette, and at least a part of a region that is not the predetermined target region such as a shadow region is not made into a silhouette. That is, since the above-described human body frame is a region which includes a person, a region that is a human body frame and has been specified as the foreground region is made into a silhouette, and a region other than the human body frame is not made into a silhouette even if it is the foreground region. Note that, as described above in one example, since the human body frame is specified as a rectangular region, a part of a shadow can be made into a silhouette in some cases. However, since the portion of the shadow that will be made into a silhouette is reduced, it becomes possible to easily determine whether the silhouette is that of a person.

Note that, in each of the above-described embodiments, a region including the characteristics of the head which is a part of a person or an object (for example, a hat) which is related to the part is specified, and a human body region is specified by expanding this specified region based on the human body ratio and the like. However, the present invention is not limited to this. For example, a region that includes the entire occlusion target object such as a person may be specified at once. For example, a specific function for detecting a human body region, which also includes a torso portion, at once can be generated by machine learning, and the human body region can be specified at once by inputting the above-described input image to this function. Note that a known arbitrary algorithm can be used for machine learning.

Each of the above-described embodiments described a method in which an occluding image is generated by abstracting a region including the predetermined target object such as a person within the foreground region. This method can be used to discover the foreground region or to highlight and display the foreground region. That is, this method can be used to surround the above-described abstraction target region by a frame and display the region or the like. Although the shadow region will also be highlighted if the foreground region is simply highlighted in these applications, the shadow region is not highlighted by the method according to the embodiments since the shadow region is handled in a different manner from that of the region including the predetermined object. Note that the above-described embodiments can be applied to various kinds of objects such as a person, a face, a car, an animal, and the like which are to be set as an abstraction or anonymization target.

Although the image processing apparatus 101 was described in each of the above-described embodiments, the above-described embodiments need not be implemented by a single apparatus. That is, each of the above-described embodiments may be formed by a system in which the above-described processing operations are shared and executed by one or more apparatuses. In one example, the system can be formed from a host computer, an interface device, an image capturing apparatus, a web application, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-220126, filed Nov. 15, 2017, which is hereby incorporated by reference herein in its entirety.

What is claimed is:

1. An image processing apparatus comprising a computer executing instructions that, when executed by the computer, cause the computer to function as:
   an extraction unit configured to extract a foreground region in a captured image, using a background difference method;
   a specification unit configured to specify, using an image characteristic of a person, a person region corresponding to the person in the captured image; and
   an output unit configured to output an output image obtained by superimposing, on an image corresponding to the captured image, an obscuring image for obscuring a first part of the foreground region, the first part of the foreground region being included in the person region specified by the specification unit, but by not superimposing, on the image corresponding to the captured image, an obscuring image for obscuring a second part of the foreground region, the second part of the foreground region not being included in the person region specified by the specification unit.

2. The apparatus according to claim 1, wherein the obscuring image for obscuring the first part of the foreground region is a silhouette image obtained by filling, with a predetermined color, a region of the foreground region that is included in the person region.

3. The apparatus according to claim 1, wherein the obscuring image for obscuring the first part of the foreground region is a mosaic image obtained by performing mosaic processing on the first part of the foreground region.

4. The apparatus according to claim 1, wherein the obscuring image for obscuring the first part of the foreground region is a blurred image obtained by blurring the first part of the foreground region.

5. The apparatus according to claim 1, wherein the specification unit specifies the person region based on a result of detecting a part of the person in the captured image, and
wherein the part of the person in the captured image is detected from the captured image by using an image characteristic of the part of the person.

6. The apparatus according to claim 5, wherein the instructions, when executed by the computer, further cause the computer to function as an obtainment unit configured to obtain information of a ratio between a size of the part of the person and an entire size of the person,
wherein the specification unit specifies the person region based on the information of the ratio and the result of detecting the part of the person in the captured image.

7. The apparatus according to claim 6, wherein the part of the person is a head of the person, and
wherein the person region defines a region includes an entirety of the person.

8. The apparatus according to claim 7, wherein the instructions, when executed by the computer, further cause the computer to function as an estimation unit configured to estimate an age of the person in the captured image,
wherein the obtainment unit obtains the information of the ratio corresponding to the age estimated by the estimation unit, and
wherein the specification unit specifies the person region in the captured image, based on a size of the head of the person and the information of the ratio corresponding to the age estimated by the estimation unit.

9. The apparatus according to claim 6, wherein the obtainment unit obtains the information of the ratio corresponding to a position of the part of the person detected from the captured image, by referring to map information associating the position and the ratio.

10. The apparatus according to claim 1, wherein the specification unit specifies a three-dimensional region in which the person is present, and specifies, as the person region, a region obtained by projecting the three-dimensional region onto a two-dimensional region of the same image capturing range as the captured image.

11. The apparatus according to claim 1, wherein the output image is obtained by superimposing, on a background image that does not include the person, the obscuring image for obscuring the first part of the foreground region, but by not superimposing the obscuring image for obscuring the second part of the foreground region.

12. The apparatus according to claim 1, wherein the output image is obtained by superimposing, on the captured image, the obscuring image for obscuring the first part of the foreground region, but by not superimposing the obscuring image for obscuring the second part of the foreground region.

13. The apparatus according to claim 1, wherein the person region specified by the specification unit corresponds to a rectangular region including the person in the captured image.

14. The apparatus according to claim 1, wherein the extraction unit extracts the foreground region in the captured image by using the background difference method in which the captured image is compared with a background image, wherein the background image does not include the person.

15. A method for image processing by an image processing apparatus, the method comprising:
extracting a foreground region in a captured image, using a background difference method;
specifying, using an image characteristic of a person, a person region corresponding to the person in the captured image; and
outputting an output image obtained by superimposing, on an image corresponding to the captured image, an obscuring image for obscuring a first part of the foreground region, the first part of the foreground region being included in the person region specified in the specifying, but by not superimposing, on the image corresponding to the captured image, an obscuring image for obscuring a second part of the foreground region, the second part of the foreground region not being included in the person region specified in the specifying.

16. A non-transitory computer-readable storage medium that stores a program for causing a computer comprised in an image processing apparatus to:
extract a foreground region in a captured image, using a background difference method;
specify, using an image characteristic of a person, a person region corresponding to the person in the captured image; and
output an output image obtained by superimposing, on an image corresponding to the captured image, an obscuring image for obscuring a first part of the foreground region, the first part of the foreground region being included in the specified person region, but by not superimposing, on the image corresponding to the captured image, an obscuring image for obscuring a second part of the foreground region, the second part of the foreground region not being included in the specified person region.

* * * * *